United States Patent [19]
Banks

[11] 3,736,806
[45] June 5, 1973

[54] MOTOR VEHICLE TRANSMISSION

[75] Inventor: Eric John Banks, Thorpe Bay, England

[73] Assignee: Ford Motor Company, Dearborn, Mich.

[22] Filed: Aug. 30, 1971

[21] Appl. No.: 176,084

[52] U.S. Cl. .................................................. 74/336
[51] Int. Cl. ............................................... F16h 5/46
[58] Field of Search ............................... 74/336, 866

[56] References Cited
UNITED STATES PATENTS

| | | | |
|---|---|---|---|
| 2,911,856 | 11/1959 | Simpson et al. | 74/336 X |
| 3,439,564 | 4/1969 | Scholl et al. | 74/336 X |
| 3,511,116 | 5/1970 | Detra | 74/866 |

*Primary Examiner*—Leonard H. Gerin
*Attorney*—Keith L. Zerschling and Donald J. Harrington

[57] ABSTRACT

A multiple ratio power transmission for trucks having synchronized ratio changes comprising a driver-operated gear shift linkage mechanism for shifting torque delivery clutch elements into and out of engagement, separate speed sensors for determining the speed of the torque input member and the speed of the torque output member for the transmission mechanism and an electronic logic circuit sensitive to the output signals of each speed sensor for conditioning the transmission mechanism for ratio changes when the speeds of the torque delivery elements are in synchronism and for controlling the relative speeds of the torque input member and the torque output member to effect synchronism during ratio changes.

7 Claims, 1 Drawing Figure

PATENTED JUN 5 1973
3,736,806
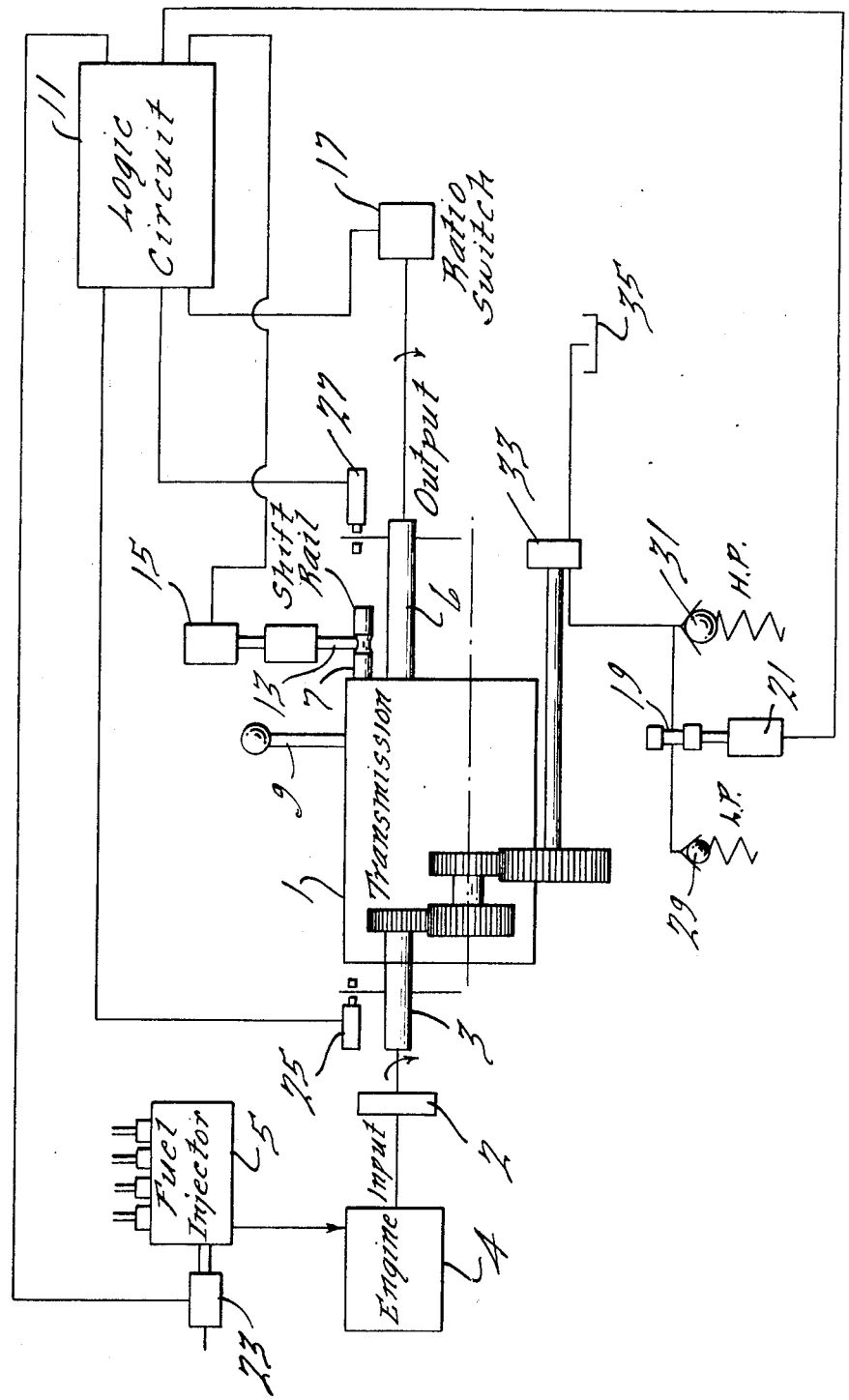
INVENTOR:
Eric J. Banks.
BY: Keith L. Zerschling
and Donald J. Harrington
ATTORNEYS.

MOTOR VEHICLE TRANSMISSION

GENERAL DESCRIPTION OF THE INVENTION

This invention comprises improvements in a manually controlled power transmission mechanism adapted especially for use in torque delivery transmissions for heavy trucks. Such transmissions usually comprise a torque input shaft and a torque output shaft situated coaxially and a countershaft situated in parallel disposition with respect to the common axis of the power input shaft and the power output shaft. A torque input gear on the torque input shaft meshes continuously with a gear element of the cluster gear assembly. The other gear elements of the cluster gear assembly mesh continuously with torque output gears mounted for rotation about the axis of the power output shaft. Synchronizer clutches are used to engage selectively the torque output gears with the torque output shaft to establish the various ratio changes. The synchronizer clutches include clutch rings which in transmissions for heavy trucks are relatively large and massive. The clutch rings and the cooperating clutch elements have a limited life because of the large torque that is distributed through them, and they are an expensive component of the transmission mechanism.

The improved transmission structure of this invention does not require the use of transmission synchronizer devices of the conventional type. It is possible to establish synchronism between tooth members of torque transmitting clutches without the use of synchronizer clutches as ratio changes are effected. A driver-operated gear shift linkage mechanism is used to actuate the tooth clutch elements during ratio changes, but synchronism between the torque input side of the torque output side of the clutches is established by an electronic logic device which is responsive to the speeds of the torque input shaft and the torque output shaft to prevent movement of the tooth elements of the clutch structure into engagement when a speed differential exists, and the clutches are conditioned for engagement by the driver-operated gear linkage mechanism when the relative magnitudes of the speed of the torque input member and the speed of the torque output member are appropriately matched.

To assist in achieving synchronism, it is necessary to reduce the speed of the input shaft relative to the speed of the output shaft under certain driving conditions. This is accomplished by a retarder device connected drivably to the torque input side of the transmission. The retarder device in turn is under the control of the electronic logic circuit.

Under certain driving conditions it is necessary to accelerate the speed of the input shaft relative to the speed of the output shaft during ratio change. This is accomplished by an accelerator mechanism which is a part of the engine fuel supply system. It is under the control of the electronic logic circuit, and when it is actuated it effects an increase in the rate of fuel supply to the engine which in turn results in an increase in torque applied to the power input shaft of the transmission.

In a multiple ratio transmission of this type, two or more clutches are required to effect ratio changes. Synchronism is established in the foregoing for each of the clutches. The response of the electronic logic circuit during each of the several ratio changes is modified by a ratio switch which is adapted to supply the logic circuit with information about the ratio position of the manually operated gear shift linkage mechanism that is chosen by the operator. Thus it is possible to achieve synchronism for each of the ratio changes in clutches by using the same input speed signal and output speed signal that are used for the other ratio changes.

BRIEF DESCRIPTION OF THE DRAWINGS

The single view in the drawings shows in schematic form a power transmission mechanism for a heavy duty truck and the associated control elements for effecting ratio changes.

PARTICULAR DESCRIPTION OF THE INVENTION

A conventional constant mesh gearbox 1 has an input shaft 3 connected to the output of a conventional friction clutch 2. The input of the friction clutch is connected to a diesel engine 4 having fuel injectors 5. The output 6 of the gearbox is connected as usual to a differential.

The gearbox 1 has conventional toothed clutch rings, each splined to a mainshaft and movable by a shift fork (not shown) into mesh with a toothed clutch ring connected to a gear (not shown) on a mainshaft. The shift forks are mounted on a shift rail 7, and the shift rail is movable through a mechanical linkage by a driver controlled element in the form of a conventional gear shift lever 9. The gearbox does not have a conventional friction synchromesh system that brings the clutch rings to the same speed before they mesh. Instead there is an electronic control system that prevents axial movement of the shift rail until the toothed clutch rings that are to be engaged by rotating at approximately the same speed.

The electronic control system includes an electronic logic device 11, a mechanical stop 13 controlled by a solenoid 15, a ratio switch 17 responsive to the position of the gear shift lever 9, a lubricating oil pressure control valve 19 controlled by a solenoid 21, a solenoid 23 operative when energized to control the fuel injectors 5, a gearbox input speed sensitive device 25 and a gearbox output speed sensitive device 27.

The input speed sensitive device 25 and the output speed sensitive 27 transmit input signals to the electronic logic device 11. The ratio switch 17 also transmits an input signal to the device 11. After the gear shift lever 9 has moved a toothed clutch ring out of mesh with one toothed clutch ring so that the gearbox is in neutral and as the lever 9 is moving that clutch ring or another clutch ring towards engagement with another clutch ring, the ratio switch 17 is actuated. The switch 17 thereupon transmits a signal to the logic device 11. The device 11 is thus controlled by the signals indicative of input and output speeds and by the signal from the ratio switch. When the speeds of the clutch rings about to engage are approximately the same, the device 11 causes energization of the solenoid 15.

The solenoid 15, as mentioned above, controls a mechanical stop 13 (or more than one mechanical stop depending on the number of shift rails in the gearbox). The stop 13 depending on the position shown engages the shift rail 7 to prevent its axial movement. When the solenoid 15 is energized, the stop is moved clear of the shift rail 7. This enables the shift rail to be moved axially so that the one clutch ring is moved into mesh with the other clutch ring.

When changing into a higher gear, the speed of the input 3 of the gearbox has to be reduced relative to the speed of the output 6 of the gearbox before the clutch rings to be engaged are rotating at the same speed. After the gearbox has been put into neutral by moving the one clutch ring out of mesh with its associated clutch ring, the speed of the input 3 will of course fall considerably more rapidly than the speed of the output 6 connected through the differential to the wheels. The reduction in speed of the input 3, however, may not be sufficiently rapid to produce an acceptably rapid gear shift.

Reference may be made to U.S. Pat. No. 3,671,081 for a description of a comparator capable of being used to perform the functions of logic circuit 11. Particular reference may be made to FIG. 1A, FIG. 6 and to the description beginning at line 19 of Column 4 of U.S. Pat. No. 3,671,081.

To increase the rate of reduction in speed of the input 3, the electronic control system controls a retarder device. The retarder device includes the lubricating oil pressure valve 29, a high pressure valve 31, and an oil pump 33.

The oil pump 33 is driven by a gear 35 in mesh with a layshaft gear and is therefore connected to the gear box input 3. The function of the pump 33 is to pump lubricating oil to the gearbox bearings in the normal manner. The output pressure of the pump is controlled by the valves 29 and 31. When the output of the pump is connected to the low pressure valve 29, the valve 29 opens to connect the pump outlet to the pump sump 35 at a relatively low pressure. This is the normal situation when the gearbox is connecting the engine to the wheels. The oil pump 33, since it is discharging oil at a relatively low pressure, imposes little load on the layshaft.

When the solenoid 21 is energized, the valve 19 is moved to a position in which the low pressure valve 29 is disconnected from the pump outlet. Consequently, the pump outlet pressure is controlled by the high pressure valve 31. Since the pump is now operating at a higher pressure, it is imposing a greater load on the gearbox input 3. As a result, the rate of decrease of the speed of the input 3 is increased.

The solenoid 21 is energized by the logic device 11 when the two following situations occur: (1) the ratio switch 17 is operated; and (2) the speeds of the pair of clutch rings to be engaged are different, the speed of the clutch ring connected to the input 3 being greater than the speed of the clutch ring connected to the output 6.

When changing from a higher gear to a lower gear, the opposite situation occurs. The speed of the input 3 of the gearbox has to be increased relatively to the speed of the output 6. The electronic control system includes an accelerator device that accelerates the clutch ring connected to the gearbox input. The accelerator device includes, besides the logic device 11, the solenoid 23 and the fuel injectors 5.

The solenoid 23 is energized by the logic device 11 when the two following situations occur: (1) the ratio switch 17 is operated and (2) the speeds of the clutch rings to be engaged are different, the speed of the clutch ring connected to the input 3 being less than the speed of the clutch ring connected to the output 6. When the solenoid 23 is energized, it operates the fuel injectors 5 to increase the fuel supply to the engine. As a result, the engine accelerates.

The engine is in a normal gear change disconnected from the gearbox until the new gear is engaged. However, in a vehicle fitted with the gearbox of this invention, the driver when changing down engages the clutch as soon as the gearbox is in neutral. As a result, the increased speed of the engine resulting from the increased fuel supply increases the speed of the gearbox input 3. When the clutch rings are in mesh, the solenoid 23 is deenergized, and the fuel injector 5 is again under the sole control of the driver.

What I claim and desire to secure by U.S. Letters Patent is:

1. A multiple speed ratio power transmission mechanism for use in an automotive vehicle driveline for delivering torque from an engine to the vehicle drive wheels comprising a power input shaft adapted to be connected to the engine, a power output shaft connected drivably to the vehicle wheels, torque transmitting gearing establishing multiple torque delivery paths between the power input shaft and the power output shaft, clutch means for connecting selectively a ratio changing gear element of the gearing to a companion torque transmitting element thereof, personally operable gear shift lever means for engaging and disengaging said clutch means, a first sensor means for sensing the speed of said power input shaft, a second sensor means for sensing the speed of said power output shaft, and means for inhibiting selectively actuation of said gear shift lever means and an electronic logic circuit connected to each of said sensor means and to said inhibitor means whereby said inhibitor means is actuated to condition said transmission mechanism for ratio changes when the speed of said ratio changing gear and its companion torque transmitting element approach synchronism.

2. A multiple speed ratio power transmission mechanism for use in an automotive vehicle driveline for delivering torque from an engine to the vehicle drive wheels comprising a power input shaft adapted to be connected to the engine, a power output shaft connected drivably to the vehicle wheels, torque transmitting gearing establishing multiple torque delivery paths between the power input shaft and the power output shaft, clutch means for connecting selectively a ratio changing gear element of the gearing to a companion torque transmitting element thereof, personally operable gear shift lever means for engaging and disengaging said clutch means, a first sensor means for sensing the speed of said power input shaft, a second sensor means for sensing the speed of said power output shaft, means for inhibiting selectively actuation of said gear shift lever means and an electronic logic circuit connected to each of said sensor means and to said inhibitor means whereby said inhibitor means is actuated to condition said transmission mechanism for ratio changes when the speed of said ratio changing gear and its companion torque transmitting element approach synchronism, a retarder means in the form of a hydrostatic pump connected drivably to said power input shaft, said pump having a pump discharge passage, valve means for increasing the fluid flow restriction of said passage to effect a hydrostatic brake for said power input shaft, an actuator for said valve means, and a connection between said logic circuit and said actuator to actuate said valve means to a flow restricting position during a ratio change when the speed of said power input shaft relative to the speed of the power output shaft is higher than a predetermined value.

3. The combination as set forth in claim 1 wherein said engine comprises a fuel metering mechanism, said metering mechanism being connected to said logic circuit whereby it is conditioned for increased fuel delivery to said engine when the speed of said power input shaft relative to the speed of said power output shaft during a shift interval is less than a predetermined value.

4. The combination as set forth in claim 2 wherein said engine comprises a fuel metering mechanism, said metering mechanism being connected to said logic circuit whereby it is conditioned for increased fuel delivery to said engine when the speed of said power input shaft relative to the speed of said power output shaft during a shift interval is less than a predetermined value.

5. The combination as set forth in claim 1 wherein said mechanism comprises a ratio switch operatively connected to said gear shift lever mechanism and to said logic circuit whereby the latter is conditioned to sense synchronism for each clutch means for each ratio change.

6. The combination as set forth in claim 2 wherein said mechanism comprises a ratio switch operatively connected to said gear shift lever mechanism and to said logic circuit whereby the latter is conditioned to sense synchronism for each clutch means for each ratio change.

7. The combination as set forth in claim 3 wherein said mechanism comprises a ratio switch operatively connected to said gear shift lever mechanism and to said logic circuit whereby the latter is conditioned to sense synchronism for each clutch means for each ratio change.

* * * * *